Aug. 25, 1959
H. B. SCHWEPPE
2,901,019
SELF-TAPPING AND SELF-LOCKING EXTERNALLY THREADED FASTENER HAVING LOCKING SECTION OF GREATER PITCH
Filed Dec. 28, 1955
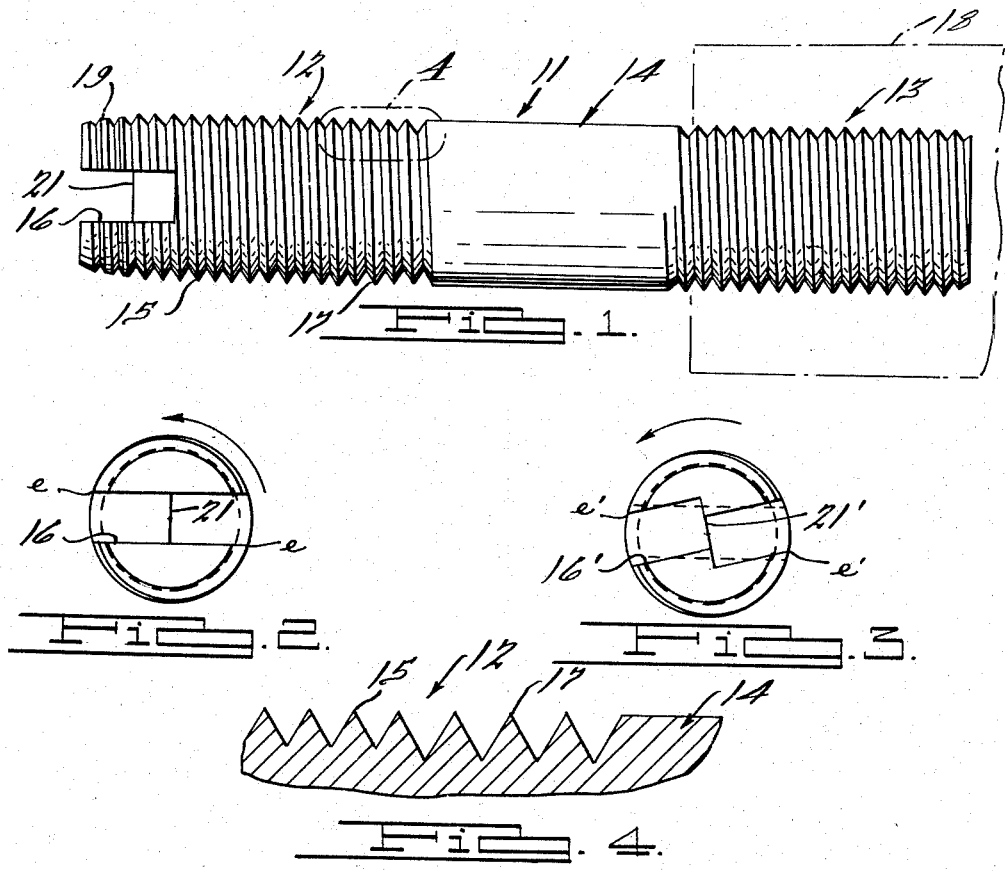
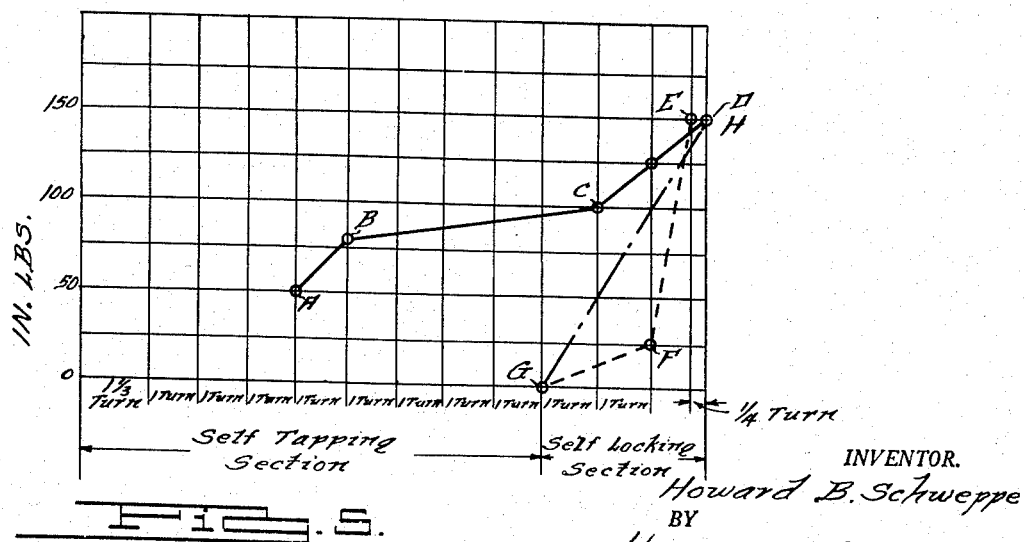
INVENTOR.
Howard B. Schweppe
BY
Harness, Dickey & Pierce
ATTORNEYS.

United States Patent Office 2,901,019
Patented Aug. 25, 1959

2,901,019

SELF-TAPPING AND SELF-LOCKING EXTERNALLY THREADED FASTENER HAVING LOCKING SECTION OF GREATER PITCH

Howard B. Schweppe, Detroit, Mich.

Application December 28, 1955, Serial No. 555,826

1 Claim. (Cl. 151—22)

This is a continuation-in-part of application Serial No. 337,924, filed February 20, 1953 and now abandoned.

This invention relates to studs, and more particularly to thread construction for studs which must meet standards of minimum removal torque.

Stud setting procedure normally requires the maintenance of minimum standards for the torque required to remove studs after they are applied to the work, the standard being usually in terms of percentage of the torque necessary to apply the stud. The need for the stud withstanding high removal torque arises not only from the applications in which studs are generally employed, viz., where a fastening means such as a nut is threadably engaged on the projecting portion of the stud and difficulty is experienced in removing the nut; but also in special applications where the stud is subjected to vibratory stresses which tend to loosen the stud from the work. The aircraft and automotive industry are faced with this problem an example being where a cylinder head must be removably secured to an engine block and where vibrations set up in the block tend to loosen the stud.

Attempts have been made to provide a stud with locking features in order to anchor the stud in the work, but thread constructions to accomplish this purpose have been of a complicated nature, deviating from conventional standard thread forms which not only increase the cost of manufacture of the stud but present difficulties of uncontrollable torque build-up which makes practical use of these studs impossible. Industry has resorted to the use of close tolerance or interference fits between the stud and the tapped hole to anchor the stud in the work. However, the use of such close fits usually involves expensive machining operations because they require that the stud must be manufactured oversize. Tolerances on ordinary machining operations are such that studs which have been made for interference fits can no longer be interchangeable. That is to say, a stud may be produced which is within the tolerances of ordinary machining operations and yet may be near the lower limit for a given nominal hole size and the hole which was tapped may be near the upper limit of tolerance. In such a case, the stud would not anchor securely because it would be undersize with respect to an interference fit. In mass production operations, noninterchangeability of parts has been the result of attempting interference fits. This means that holes must each be separately gauged and the studs must be separately gauged. Those studs which are oversize must be kept separate and identified for use with holes that in turn must be identified as undersize in order to make an interference fit. These separate tapping and individual gauging operations are costly requirements, but have been necessitated by the failure of the art to provide a stud which firmly anchors into the work so as to be secure from loosening under conditions of vibration or other factors experienced in use and which so anchors without widely variant torque build-ups.

It is a principal object of the present invention to overcome the foregoing difficulties by providing a stud which cuts its own thread and has a self-locking structure wherewith the torque build-up during tapping and locking can be predicted notwithstanding differences in normal drill hole sizes and physical characteristics of the work, and to provide a stud which accomplishes these functions with a minimum of manufacturing cost.

Other objects of the invention are to provide a self-locking stud employing standard thread profiles whereby the stud is adapted for production with conventional dies; to provide a self-locking stud which has a self-tapping section forward of the self-locking section and wherein the threads in each section are of constant but different pitch; to provide the self-locking structure in a form which is preferably limited to the last few threads in the anchoring end of the stud whereby progressive uncontrolled torque build-up is prevented; to provide the stud with a thread cutting structure which adapts the same to hopper feed automation techniques and to provide improvements which increase the thread cutting ability and effect economies in the manufacture of the stud.

The above and other objects of the present invention will be apparent during the following description, reference being had to the accompanying drawings, wherein a preferred embodiment of one form of the present invention is clearly shown.

In the drawings:

Figure 1 is a side elevation of the improved stud embodying the present invention;

Fig. 2 is a view of the thread cutting end of the structure of Fig. 1;

Fig. 3 is an end view of a modified form of thread cutting structure;

Fig. 4 is an enlarged sectional view of certain parts of the structure in Fig. 1, showing the details of the thread construction in the self-locking and self-tapping section; and Fig. 5 is a graph of torque build-up measured during insertion of the stud of the present invention plotted against rotational turns in a typical workpiece with a typical thread engagement.

Prior types of self-locking studs have not received widespread acceptance because special non-conventional thread constructions have been employed, which increase the manufacturing cost and which result in undesirable non-uniformity of performance because of the widely variant and unpredictable torque build-up during insertion of such studs. The stud of the present invention permits of predictably controlling the torque build-up during the tapping and locking phases of the insertion of the stud into the work and this is accomplished by the improved thread construction presently to be described. Tests have been conducted which show that it is possible to predict the maximum torque required to drive the stud through the self-tapping section, the maximum torque required to lock the stud in final lock position, the maximum breakaway torque required to loosen the stud and the maximum torque required to re-lock the stud and have also proved that these torque requirements can be predeterminedly selected depending upon the characteristics of the work, the hole size and the percent of thread engagement. These tests have demonstrated the criticality of certain features of the stud in order to accomplish these functions in the cheapest manner possible.

Generally, the stud 11 comprises an anchor portion 12 and a projecting portion 13 which protrudes from the work when the stud 11 is anchored therein. An unthreaded cylindrical portion 14 interconnects the anchor portion 12 and projecting portion 13 of the stud. The projecting portion 13 may be of any standard thread form. The anchor portion 12 is made up of two sections; a self-tapping section 15 on the entering end of the stud, and a self-locking section 17 formed on the anchor portion 12 inwardly of the self-tapping section 15. Formed foremost in the entering end of the stud is a tapered pilot 19 of well-known construction for initially inserting the stud into a previously drilled hole to begin the tapping operation. Formed centrally of the entering end of the stud 11 is a slot 16 which extends rearwardly into the anchor portion a distance greater than the length of the tapered pilot 19 for reasons which will appear more fully hereinafter.

The adjacent threads in the self-tapping section 15 and in the self-locking section 17 are of the same outside diameter, and this is important, as will be explained, the tapered pilot 19 being the only change in outside diameter along the entire length of the anchor portion of the stud. It has been found that the threads in each section must be of constant pitch and to effect a self-locking action which is manifestly superior, the threads of the self-locking section must be of different pitch than the threads of the self-tapping section. It is especially important that the adjacent threads in each section have identical thread profiles and except for the tapered pilot 19, as described, the thread profile over the entire length of the anchor portion of the stud is the same. By the same thread profile is meant the same included angle between the flanks of the thread and similar cross-sectional form, i.e., similar triangles or as near to such as standard threads are. Threads which conform to the dimensions of the American Standard Screw Threads, as published by the American Standards Association, are most preferred for reasons of adaptability to manufacture by conventional dies and interchangeability of the stud with conventional studs when the former is used as a replacement for the latter. Preferably the self-tapping section extends a major distance over the length of the anchor portion and the self-locking section is limited to the last few threads which enter the work. Such a stud is illustrated in my copending application, Serial No. 337,924, filed February 20, 1953, now abandoned of which this application is a continuation-in-part.

Considering the figures in more detail, Fig. 1 shows the self-tapping section 15 which extends from the entering end of the stud rearwardly along a major distance of the anchor portion 12. The threads of the self-tapping section 15 are of constant pitch and conform to standard screw threads. Formed inwardly of the self-tapping section is the self-locking section 17 which is preferably confined to the last few threads which enter the work. The threads in the self-locking section 17 are also of constant pitch and conform to standard screw threads. Fig. 4 shows in detail the arrangement between the threads of the self-locking section 17 and the self-tapping section 15. The threads of the two sections are of different pitch and are abruptly formed over a single convolution preferably, although a number of convolutions may be used to accomplish the change in pitch. The adjacent threads of the two sections have identical outside diameters and this is important for the reason that the threads on the self-locking section must freely enter and be engageable with the threads formed in the work by the self-tapping section. It is also essential that the threads of the two sections have the same thread profile in order to effect the superior locking action characteristic of the stud of the present invention. This is thought to be due to the fact that with threads on the self-locking section entering into previously formed threads formed in the work which have the same thread profile but different pitch a more uniform and controllable torque build-up is produced which depends less upon cold working of the material of the work between the thread flanks and principally on locking between the flanks of the thread. By having the same thread profiles and different pitch on the two sections, a uniform and predictable torque build-up is experienced during the tapping action and the increased torque build-up from the locking action is likewise uniform and predictable. A progressively increased and uncontrollable torque build-up is eliminated by the virtue of the thread construction described. It has been found that effective locking action can be accomplished with a thread engagement between 25 to 65% full thread engagement and heretofore this has not been attainable with prior means for locking studs in work. In Fig. 4, the pitch of the self-locking section is shown to be greater than the pitch of the self-tapping section and this arrangement is preferred, although it will be understood that it is contemplated to provide the threads of the self-locking section with a pitch which is smaller than that of the self-tapping section and in either case the root diameter of the threads in the self-locking section will be different than that of the self-tapping section due to the geometries of the thread forms and the maintenance of the outside diameter.

Fig. 2 is an end view of the thread cutting structure on the anchor portion 12 of the stud and the details thereof will be described. The stud operates on the thread cutting principle, rather than on the thread indenting principle in initially providing threads in a preliminary untapped hole. The thread cutting edges for the stud are, of course, provided by the edges formed on the threads along the longitudinal sides of the slot; these threads providing the cutting action and the subsequent threads in the self-tapping section morely finishing or smoothing the threads so cut. When the stud is turned into the work in the direction of the arrow shown in Fig. 2, the effective thread cutting edges are indicated by the letter *e* and these edges extend over the length of the slot 16. The distance over which these edges extend determine the extent of thread cutting which takes place when the stud is driven into the work. One of the objects of the invention is accomplished, viz., increasing the thread cutting ability of the stud by extending the depth of the slot 16 rearwardly of the entering end a greater distance than the length of the tapered pilot 19, and this provides for thread cutting edges on threads which have a full outside diameter so that the threads which are cut into the work more readily accommodate the threads entering the work subsequently to the thread cutting threads. This insures that the locking action will take place with considerably less than full thread engagement and contributes to the uniformity of the torque build-up while driving the stud into the work. It will be apparent, of course, that this is not an essential construction for the operation of the stud, but it is a preferred one.

The slot 16 in the stud not only provides for chip accommodation, as is well known, but it has been found that it serves the additional function of adapting the stud to automation techniques in that it is the only stud, as best known, which can be hopper fed and this is by reason of the slot at the entering end. The slot differentiates one end of the stud and thereby provides a means to locate the stud and convey it in a selected manner (as by engaging the slot in a rail) from a haphazardly arranged load in a hopper or bin.

As will be seen in Fig. 2, the line 21 represents the intersection of two angularly disposed planes formed in the bottom of the slot during the formation of the slot in the stud. The slot is produced in the stud by cutting tools which enter from both sides of the stud, either in sequence or simultaneously. The heat generated during the cutting of the slot is considerably decreased by this preferred method, since approximately one-half only of the material from the body of the stud is removed by each cutting tool.

Fig. 3 is an end view of a modified form of thread cutting construction formed in a similar manner to that previously described except that each of the cutting tools which enter from the sides of the stud body to form the slot, designated 16' in this instance, are disposed at an angle with respect to the parallel horizontal dotted lines shown in Fig. 3. This results in a more acute or steeper angle of rake (the angle formed between the side of the slot and the tangent to the circumference of the stud at the point of intersection of the two) at the effective cutting edges designated e' for the direction of rotation shown by the arrow in Fig. 3. The increased angle of rake increases the cutting efficiency of the stud and is possible of formation by the foregoing method of forming the slot in the body of the stud by separate cutting tools entering from both sides thereof. The slot 16' is thus divided transversely into two portions which are offset with respect to each other so as to steepen the angle of rake along diametrically opposed edges of said slots. The intersection of the two planes forming the bottom of the slot is represented by the line 21'.

The proven superior performance of the stud of the present invention is attributable to the special thread construction previously described and the predictable uniform torque build-up of the stud is shown graphically in Fig. 5 which is based on compilation of data on the stud in a typical application. The basis of the graph of Fig. 5 resulted from a test of a 1½" long cold rolled stud having a 5/16 nominal diameter with 18 threads/in. in the self-tapping section and 17½ threads/in. in the self-locking section. The test material was 11ST4 aluminum and the test conditions were as follows: double nut on the projecting end which had 24 threads/in.; 200 and 300 in. lb. Sturtevant torque meters were used; and 45% of full thread engagement was employed. Torque in in./lbs. was plotted as ordinates against rotational turns of 360° as abscissae. The torque build-up in driving the stud into the work to the depth of the slot is represented by the letter A and the line AB represents the torque build-up in driving the stud into the work two full threads past the depth of the slot. The line BC represents the torque build-up in further driving the stud to the first thread of different pitch on the self-locking section. The line CD represents the torque build-up in driving the thread to full locking position wherein the different pitch threads of the locking section are engaged in the threads formed by the self-tapping section. The break-away torque is represented by the letter E and this is the torque required to loosen the stud from full locking position to a position where it is rotatable (¼ turn) and it will be noted that the break-away torque is substantially equal to the torque required to drive the stud into full lock position and this is unlike heretofore means proposed for locking studs in work where it is characteristic that the stud, in order to be locked effectively, is for all practical purposes permanently secured in the work and the break-away torque in many instances is manyfold times greater than the torque to drive the stud into locked position. Each phase of the torque build-up is uniform in driving the stud into full lock position as depicted by the lines ABCD and this with the nearly equal break-away torque represented by the letter E provides for a predictability of torque requirements heretofore unknown in locking studs into work. Advantages such as less scrappage due to breaking, stripping of threads and reduced failures in service are apparent and attributable to the fact that the self-tapping and self-locking sections have threads of constant pitch with the same outside diameter and thread profiles but different pitch threads in each of the two sections.

Referring again to Fig. 5, the dotted lines EF and FG represent the decrease in torque as the stud is unthreaded from the work after having been driven to full lock position, negligible torque being present after the self-locking section is unthreaded from the work. The dotted lines G to H represents the torque build-up when the stud is relocked into the same threaded hole which it had previously formed and again the torque build-up in this instance is uniform and it will be noted that the value of the torque required to drive the stud into full relock position is substantially the same as that required to lock the stud in the untapped hole and this is a substantial advantage because the same firm locking and uniform torque build-up occurs when the stud is employed in previously tapped holes.

When applying the stud 11 to the work, a conventional stud runner or stud setter 18, shown partially in outline in Fig. 1, may be used, the stud runner being threaded onto the projecting portion 13 of the stud. The stud runner 18 may, for example, be of a known adjustable torque type producing a predetermined maximum torque on the stud as it drives it into full lock position. In the present instance, it will be seen that the self-tapping section 15 of the stud will cut a thread of standard pitch and form in the work, this action producing a torque build-up overcome by the stud runner of a nature similar to that depicted in Fig. 5.

When the threads of the self-locking section 17 reach the tapped hole, the change in pitch will cause them to be engaged in the previously tapped threads and with the outside diameter and thread profile being the same on both sections the locking will occur between the flanks of the threads in the work and the threads in the self-locking section so as to securely anchor the stud 11 within the hole, the additional torque build-up required being similar to that shown in Fig. 5 for the locking section.

The modified form of thread cutting structure disclosed herein, namely, the offset slot construction shown in Fig. 3 is claimed in my copending application Serial Number 815,688 filed May 25, 1959 which is a division of this application.

It will thus be seen that there has been provided by this invention a stud which cuts its own thread and firmly anchors itself into the work with a uniform and predictable torque buildup, and accomplishes these functions by an improved, low cost thread construction. While the preferred embodiment of the invention has been shown and described, it is to be understood that various modifications, changes in size, shape and arrangement of parts may be resorted to without departing from the spirit of the invention or the scope of the appended claim.

What is claimed is:

A self-tapping and self-locking externally threaded fastener comprising an anchor portion having substantially V-shaped thread convolutions continuously over its length, said anchor portion having a threaded self-tapping section immediately inwardly of its entering end including a thread cutting structure having metal cutting edges, an intermediate section of constant pitch and of substantially standard root surfaces inwardly of said self-tapping section and a threaded self-locking section of constant pitch and of substantially standard root surfaces inwardly of said intermediate section, the threads of said self-locking section having the same included angle between the flanks of the thread and similar cross-sectional form and the same outside diameter as the adjacent threads of the intermediate section but being of greater pitch and lesser root diameter than the threads of said intermediate section, said self-locking section being formed on said anchor portion in the last few thread convolutions at the rearward end thereof, the change in pitch being of the order of ½ thread per inch and being accomplished over approximately a single thread convolution so as to lock in the threads formed by said self-tapping section when the fastener is rotated into the work and so that substantially all of the locking occurs at the flanks of the threads with a minimum of cold working and with a uniform and controllable torque buildup.

References Cited in the file of this patent

UNITED STATES PATENTS

| | | |
|---|---|---|
| 1,895,845 | D'Halloy | Jan. 31, 1933 |
| 1,909,476 | Trotter | May 16, 1933 |
| 2,093,171 | Olson | Sept. 14, 1937 |

(Other references on following page)

UNITED STATES PATENTS

| | | |
|---|---|---|
| 2,113,600 | Olson | Apr. 12, 1938 |
| 2,269,476 | Poupitch | Jan. 13, 1942 |
| 2,278,377 | Cook | Mar. 31, 1942 |
| 2,356,098 | Steinle et al. | Aug. 15, 1944 |
| 2,360,826 | Cherry | Oct. 24, 1944 |
| 2,383,231 | Anderton | Aug. 21, 1945 |
| 2,419,555 | Fator | Apr. 29, 1947 |
| 2,421,181 | Batchelder | May 27, 1947 |
| 2,507,882 | Berman | May 16, 1950 |
| 2,572,647 | Merwin | Oct. 23, 1951 |

FOREIGN PATENTS

| | | |
|---|---|---|
| 17,482 | Great Britain | Aug. 20, 1908 |